Figure 1:
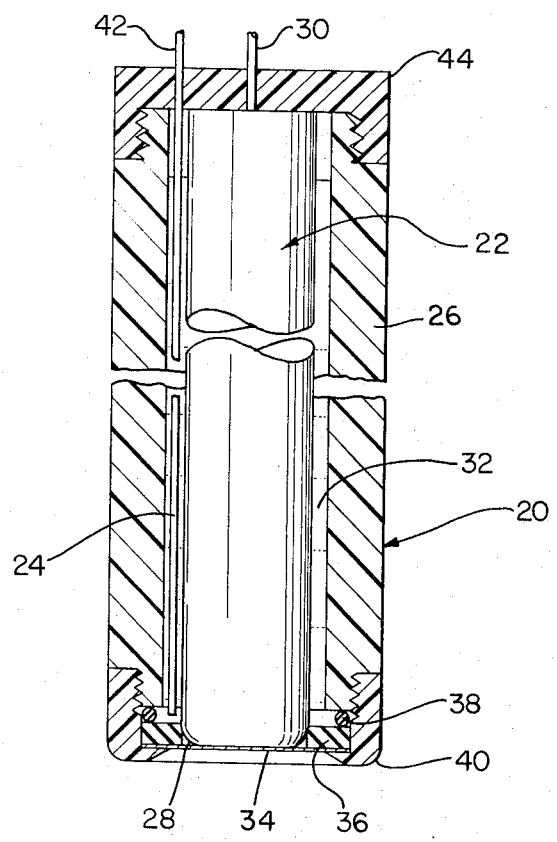

# United States Patent
Krueger et al.

[11] 3,803,006
[45] Apr. 9, 1974

[54] METHOD OF DETERMINING SULFUR DIOXIDE AND SENSING CELL THEREFOR

[75] Inventors: John A. Krueger, Cambridge; Martin S. Frant, Newton; John H. Riseman, Cambridge, all of Mass.

[73] Assignee: Orion Research Incorporated, Cambridge, Mass.

[22] Filed: Apr. 9, 1973

[21] Appl. No.: 349,393

[52] U.S. Cl. ............................ 204/1 T, 204/195 P
[51] Int. Cl. .................................... G01n 27/46
[58] Field of Search ............ 204/195 P, 1 T; 324/29

[56] References Cited
UNITED STATES PATENTS

| 3,515,658 | 6/1970 | Amdur | 204/195 P |
| 3,622,488 | 11/1971 | Chand et al. | 204/195 P |
| 3,649,505 | 3/1972 | Strickler et al. | 204/195 P |
| 3,718,546 | 2/1973 | Salzano et al. | 204/1 T |
| 3,756,923 | 9/1973 | Dahms | 204/1 T |

*Primary Examiner*—G. L. Kaplan
*Attorney, Agent, or Firm*—Schiller & Pandiscio

[57] ABSTRACT

An improved gas sensing electrochemical cell for measuring dissolved sulfur dioxide in a sample solution. The cell comprises a potentiometric hydrogen ion-sensitive electrode and a reference or standard electrode, both in contact with an internal standard solution comprising an aqueous solution of a sulfite salt and a sulfur dioxide oxidation inhibitor. A hydrophobic gas-permeable membrane separates the sample solution from the electrode internal solution.

9 Claims, 2 Drawing Figures

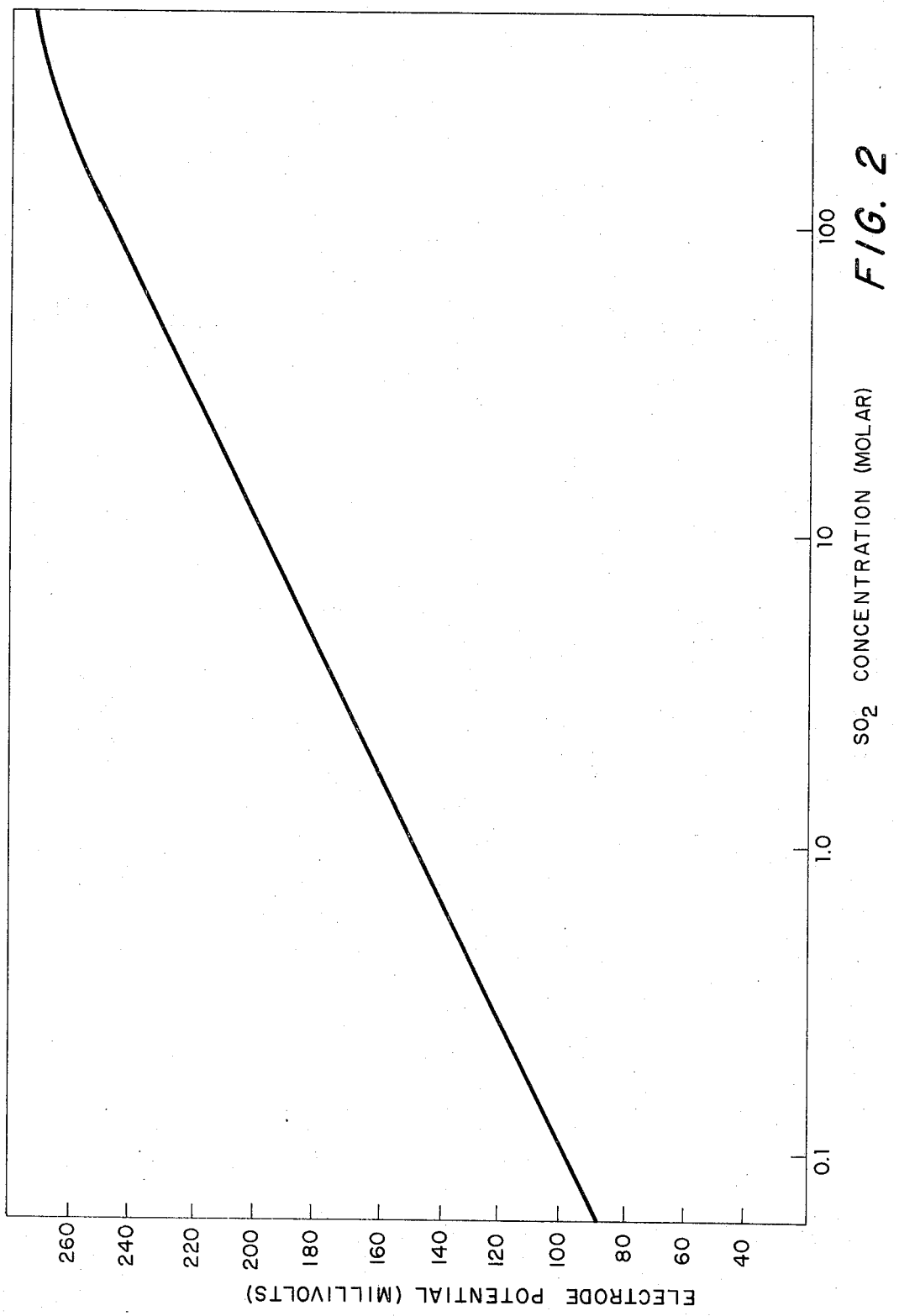

METHOD OF DETERMINING SULFUR DIOXIDE AND SENSING CELL THEREFOR

This invention relates to electrochemical detection and measurement, and more particularly to the detection and measurement of sulfur dioxide.

Considerable interest exists currently in detecting and measuring sulfur dioxide, particularly since sulfur dioxide is considered to be a pollutant byproduct of many industries, particularly as a combustion product from the burning of fossil fuels. A number of gravimetric and volumetric methods currently in use for determining sulfur dioxide have significant disadvantages. Usually, such methods require isolating a sample and subsequent analysis at a later point in time. Obviously such systems cannot be used for continuous, real-time monitoring. Efforts made to develop room temperature electrochemical electrodes showing reversible Nerstian potentials with respect to sulfur dioxide have heretofore been unsuccessful. For example, to measure sulfur dioxide electrochemically, the prior art typically would dissolve a sulfur dioxide sample in water, and add excess iodine so that the iodine and sulfur dioxide react to form iodide and bisulfite, respectively. The iodide formed was then measured using an iodide-sensitive electrode. Obviously, such electrochemical system is not continuous, real-time monitoring.

A principal object of the present invention therefore is to provide a novel system for detecting and measuring sulfur dioxide. Other objects of the present invention are to provide a novel electrochemical cell which can be used to directly measure sulfur dioxide concentration or activity; to provide such an electrode which shows substantially reversible Nernstian potentials with respect to sulfur dioxide concentration; to provide a novel method of detecting and measuring sulfur dioxide concentration; and to provide such a method which may be used for continouus, real-time monitoring of sulfur dioxide concentrations.

To effect the foregoing and other objects, the present invention contemplates an improved electrochemical gas-sensing system having a potentiometric hydrogen-ion sensitive electrode and a reference electrode both in contact with an internal standard solution comprising an aqueous solution of a sulfite salt, and a sulfur dioxide oxidation inhibitor. A hydrophobic gas-permeable filter or membrane separates the sample solution from the electrode internal-solution.

Other objects of the present invention will in part appear obvious and will in part appear hereinafter. The invention accordingly comprises the apparatus possessing the construction, combination of elements and arrangement of parts and the method constituting the several steps and order thereof, all of which are exemplified in the following detailed disclosure and the scope of the application of which will be indicated in the claims.

For a fuller understanding of the nature and objects of the invention reference may be had to the following detailed description taken in connection with the accompanying drawings wherein:

FIG. 1 is a diagramatic cross-sectional representation of an exemplary electrode formed according to the principles of the present invention; and FIG. 2 is a graph showing the typical response of an $SO_2$ sensitive cell of the present invention.

Referring now to the drawings, there will be seen in FIG. 1 a specific embodiment of an ion sensitive electrochemical cell 20 embodying the principles of the present invention and comprising pH electrode 22 and reference electrode 24. Cell 20 typically comprises hollow tubular enclosure 26 of a electrically non-conductive material such as polytetrafluorethylene or the like. Disposed within the interior of enclosure 26 is electrode 22 which can be any of a number of well-known pH glass electrodes usually formed as a hollow cylinder of a non-conducting glass, closed at one end by a bulb or membrane 28 of a hydrogen-ion sensitive glass. Such pH electrodes also include an internal reference electrode, typically Ag/AgCl (not shown), immersed in a suitable electrolytic filling solution. The internal reference of the pH electrode is connected to external lead 30.

Enclosure 26 is internally dismensioned so that there is a substantial interspace between the external periphery of pH electrode 22 and the interior wall of enclosure 26. Disposed within that interspace is standard solution 32.

Gas-permeable (i.e., at least to $SO_2$) membrane 34 is supported about its periphery by one side of spacer ring 36. Membrane 34 is stretched across the other side of spacer ring 36 and thereby held in a predetermined relation to membrane 28. Spacer ring 36 is sealed across an open end of enclosure 26 by elastomeric O-ring 38. Spacer ring 36, O-ring 38 and membrane 34 are all releasably held in their predetermined relation with respect to membrane 28 by cap 40 which is threadedly mounted on enclosure 26. Lastly, a second or reference electrode 24, typically an Ag/AgCl wire, is also disposed in contact with solution 32 to complete the electrochemical cell. Electrode 24 is coupled to external lead 42. The other end of enclosure 26 is preferably closed by cap 44 which also serves as a support for leads 30 and 42.

Membrane 34 is preferably held by cap 40 and spacer ring 36 so that the interspace between the planar surface of pH-sensitive membrane 28 and the planar surface of membrane 34 is extremely thin. That interspace communicates with the body of solution 32 but will contain a very thin film, typically less than a mil inch, of solution 32.

Membrane 34 is formed of a microporous hydrophobic material having a porosity sufficiently great so as to readily pass sulfur dioxide gas but not great enough to permit any appreciable passage of liquid or ions. Preferably membrane 34 comprises a thin (typically about 2–10 mil inches thick) flat disc formed of a microporous polytetrafluorethylene, silicone-treated polyvinyl chloride, and the like, typically having an average pore size in the range of from about 0.4 to 1 microns, preferably about 0.6 microns, and an average free area of as much as 80 percent or more.

Membrane 34 is preferably highly hydrophobic, substantially impermeable to liquid water and dissolved ionic species, and not wetted or corroded even by strong acids. For example, the membrane may be used indefinitely and continuously at a pH even as low as about 0.5.

Standard or reference solution 32 is preferably an aqueous solution of an easily or readily soluble bisulfite or sulfite salt such as the salt with a monovalent cation, e.g., sodium, potassium or ammonium salt. It will be appreciated that such salts dissociate in aqueous solution to form bisulfite ions ($HSO_3^-$) as well as sulfite ions ($SO_3^{--}$). However, if the salt concentration is too high, the lower limit of detection increases because sulfite salt particularly will also dissociate to yield some free $SO_2$. Hence, it is preferred to provide the bisulfite or sulfite salt at a concentration of about $1 \times 10^2 M$. This will provide an electrochemical system capable of operating substantially over a four decade range of $SO_2$ concentration, i.e., from about $10^2$ to $10^6 M$. However the range can be shifted by about 1 decade in either direction by adjusting the molarity of the sulfite solution.

Alternately, such a solution can be formed in situ by using an alkali metal hydroxide solution, and allowing sulfur dioxide to diffuse across the membrane into solution 32. However, this system requires considerable "start up" time to reach initial equilibrium, hence is not preferred.

The presence of the Ag/AgCl electrode requires that electrolyte 32 include a level of chloride which is fixed (e.g., at $1 \times 10^{-3}M$) at a value selected only for convenience.

Using this electrolyte in a cell of the type described above, it has now been found that the potentials developed upon diffusion of $SO_2$ through membrane 34 tend to drift, apparently due to the formation of the $H_2SO_4$ in electrolyte 32 from the $SO_2$ introduced. This formation of acid is here irreversible, hence tends to alter the pH and total ionic strength of the electrolyte. To overcome this problem, electrolyte 32 also preferably includes a sulfur dioxide oxidation inhibitor. Various sulfur dioxide oxidation inhibitors are known, including lower aliphatic and aromatic alcohols, aldehydes and ketones, lower weight glycols and staining chloride. However, the inhibitor chosen must be compatible with the entire system and particularly cannot cause wetting of gas-permeable membrane 34, since such wetting will permit transfer of liquid water and ionic constituents across the membrane. This wetting property together with the volatility of alcohols which permits evaporation out of the electrolyte, make alcohols not particularly desirable as inhibitors, so that the preferred inhibitor is glycerol which possesses neither of these undesirable properties.

The operation of the $SO_2$ sensing electrochemical cell of the present invention is based on a potentiometric measurement of the change of pH of electrolyte 32 caused by diffusion of sulfur dioxide through membrane 34. Sulfur dioxide will diffuse into and out of standard solution or electrolyte 32 until the partial vapor pressure of sulfur dioxide on both sides of membrane 34 is equal.

The sulfur dioxide diffusing through membrane 34 will dissolve in the water of electrolyte 32 and will react with hydrogen ions to some extent to form bisulfite and sulfite ions according to the following equations:

$$SO_2 + H_2O \rightleftharpoons H^+ + HSO_3^- \quad (1)$$

where $$[H^+][HSO_3^-]/[SO_2] = K_1 \quad (2)$$

and $$HSO_3^- \rightleftharpoons H^+ + SO_3^{--} \quad (3)$$

where $$[SO_3^{--}][H^+]/[HSO_3^-] = K_2 \quad (4)$$

($K_1$ and $K_2$ being the dissociation constants)

If solution 32 contains salt in sufficient amount so that the bisulfite ion concentration of solution 28 may be considered as fixed, it is seen that the hydrogen ion concentration of solution 28 will be function of the sulfur dioxide concentration:

$$[H^+] = [SO_2] K_3 \quad (5)$$

where $$K_3 = K_1 \cdot K_2 \quad (6)$$

The resulting change in hydrogen ion concentration can be measured by pH electrode 22 which is in contact with solution 32. The potential at electrode 22 will vary with any change in the hydrogen ion concentration in solution 32 according to the well known Nernstian equation as follows:

$$E = \text{constant} + RT/F \ln [H^+] \quad (7)$$

Substituting Equation (5) into Equation (7) indicates that the electrode response to sulfur dioxide should also Nernstian, but in fact the response is between about 52–59 mv/decade. While this does not appear to be a truly Nernstian slope, it is nevertheless quite reproducible empirically.

By known calibration techniques, the sulfur dioxide concentration can be read directly on a known high input impedance device connected across the pH and reference electrodes.

In practice, certain commonly encountered gases may also diffuse into electrolyte 32 and dissociate to some extent, thus causing spurious readings. For example, in an electrolyte of pH 1.8, and for an $SO_2$ concentration of about $10^{-4}M$, up to about $3 \times 10^{-3}M$ of HF and up to about 1 M or more of HCl can be tolerated. Carbon dioxide, commonly present in aqueous solutions, may be tolerated in amounts up to about $2 \times 10^{-2}M$ under similar conditions.

Also, chlorine, and nitrogen oxides (particularly nitrogen dioxide $NO_2$), may react quantitively with sulfur dioxide and thus interfere with the cell response. Accordingly, it is desirable to add either to the electrolyte or to the sample solution or both, a scavenger for the chlorine and nitrogen dioxide, typically hydrazine.

Ionic species normally cannot cross the gas-permeable membrane and therefore will not affect electrode operation. However, the level of ions in the solution may affect solubility of the sulfur dioxide in the solution to some extent and effect electrode calibration. Thus, where lower levels of ions (and other dissolved species) are present in electrolyte 32 than in the sample solution, the two solutions can be brought to harmony simply by diluting the latter. Typically, when the sample solution contains more than about 0.5 M of the dissolved species, it is desirable to dilute the sample, provided the dilution does not reduce the sulfur dioxide to a level below about $10^{-6}$M.

For dilute sample solutions, addition of a sulfuric acid-sodium sulfate buffer serves both to fix the sample pH and provide a constant sample ionic strength.

An illustrative method of use of this electrode will now be described:

With the cell connected across a suitable high impedance potentiometric measuring device (e.g., a standard pH meter), a calibration curve is prepared by inserting the cell into a series of standardizing solutions containing successively increased known $SO_2$ concentrations, and the potential across leads 30 and 42, read out in millivolts, is recorded. The standardizing solutions are chosen to bracket the expected $SO_2$ concentration ranges of the sample by at least an order of magnitude on each side of the expected concentration. The readings of potential are plotted on semilog graph paper on the linear axis against concentration on the semilog axis as shown in FIG. 2.

The sample solution for all following examples is then prepared. This solution must, because of the partial pressure relationship previously discussed, be at substantially the same temperature and have substantially the same composition of dissolved species as the standardizing solution. This is accomplished, and by the addition of an acidified aqueous solution of glycerol and $Na_2SO_4$ which acts both as a sulfur dioxide oxidation inhibitor, and a pH buffer.

EXAMPLE I

Sulfur dioxide concentration in a flue gas is measured as follows: Sulfur dioxide is collected by bubbling the flue gas through an aqueous NaOH solution (0.1 M NaOH). Glycerol (1 percent by weight) is added to the solution as sulfur dioxide oxidation inhibitor and 0.1 M $Na_2SO_4$ is added.

Flow of flue gas into the solution is maintained at a substantially constant rate for about 30 minutes.

The resulting solution is acidified to pH 2 by addition of 90 percent $H_2SO_4$.

Finally the cell which has been standardized, is dipped into the sample solution, allowed to equilibrate, and the cell potential read out in millivolts. The concentration of sulfur dioxide in the solution is read from the calibration curve previously derived.

Knowing the flow rate of the flue gas, and the collection time, the concentration of sulfur dioxide in the flue gas is calculated from the reading from the calibration curve.

EXAMPLE II

A quantity of $Cl_2$ gas is bubbled into the same sample solution. The cell read-out is observed to change, thus indicating that $Cl_2$ gas may affect $SO_2$ measurement.

With addition of 10 ml. of $10^{-2}$ M hydrazine solution (aqueous) (which acts as a scavenger for the $Cl_2$ gas) to the sample solution the cell read-out substantially returns to the reading observed in Example I.

EXAMPLE III

Example II is repeated with the following exception: $NO_2$ gas is bubbled into the solution in place of $Cl_2$ gas. Cell read out is observed to shift, and will substantially return after addition of 10 ml. of $10^{-2}$M hydrazine solution.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. An improved gas-sensing electrochemical cell for measuring the sulfur dioxide content of a sample, said cell including a potentiometric hydrogen ion-sensitive electrode and a reference electrode both in contact with an electrolyte;

and a sulfur dioxide-permeable membrane arranged to separate said electrolyte and electrodes from said sample such that the passage of sulfur dioxide through said membrane between said electrolyte and sample will alter the hydrogen ion activity of said electrolyte, said electrolyte comprising an aqueous solution of a sulfite or bisulfite salt and a sulfur dioxide oxidation inhibitor, which inhibitor will not cause said solution to wet said membrane.

2. The electrochemical cell as defined in claim 1 wherein said salt is selected from the group consisting of the bisulfites or sulfites with monovalent cations.

3. The electrochemical cell as defined in claim 1 wherein said oxidation inhibitor comprises glycerol.

4. The electrochemical cell as defined in claim 1 further including hydrazine dissolved in said electrolyte.

5. An electrochemical cell as defined in claim 1 wherein said reference electrode is an Ag/AgCl electrode.

6. An electrochemical cell as defined in claim 1 wherein said hydrogen ion-sensitive electrode includes as the ion-sensitive portion thereof, a pH responsive glass membrane.

7. The method of determining sulfur dioxide concentration comprising adding a sulfur dioxide oxidation inhibitor to an electrolyte containing sulfite ions to substantially eliminate the formation of sulfuric acid in said electrolyte;

diffusing said sulfur dioxide through a membrane into said electrolyte; and electrochemically determining the hydrogen ion activity in said electrolyte.

8. The method as defined in claim 7 wherein said oxidation inhibitor comprises glycerol.

9. The method of determining sulfur dioxide content of a sample solution with an electrochemical electrode having an internal solution into which said sulfur dioxide is measured after diffusion of the latter through a membrane from said sample solution, the improvement comprising the step of adding a sufficient quantity of hydrazine to said sample solution to substantially eliminate the presence of any free chlorine and $NO_2$ in said sample solution.

* * * * *